(12) United States Patent
Chen

(10) Patent No.: US 10,509,578 B2
(45) Date of Patent: Dec. 17, 2019

(54) LOGICAL ADDRESS SPACE FOR STORAGE RESOURCE POOLS

(71) Applicant: Red Hat, Inc., Raleigh, NC (US)

(72) Inventor: Huamin Chen, Westborough, MA (US)

(73) Assignee: Red Hat, Inc., Raleigh, NC (US)

( * ) Notice: Subject to any disclaimer, the term of this patent is extended or adjusted under 35 U.S.C. 154(b) by 160 days.

(21) Appl. No.: 15/099,528

(22) Filed: Apr. 14, 2016

(65) Prior Publication Data

US 2017/0300262 A1    Oct. 19, 2017

(51) Int. Cl.
    *G06F 3/06*    (2006.01)

(52) U.S. Cl.
    CPC .......... *G06F 3/0631* (2013.01); *G06F 3/0604* (2013.01); *G06F 3/0683* (2013.01)

(58) Field of Classification Search
    None
    See application file for complete search history.

(56) References Cited

U.S. PATENT DOCUMENTS

| | | | |
|---|---|---|---|
| 5,623,654 A * | 4/1997 | Peterman | G06F 12/023 |
| 5,930,827 A * | 7/1999 | Sturges | G06F 12/10 |
| | | | 711/170 |
| 8,161,251 B2 | 4/2012 | Obr et al. | |
| 8,874,749 B1 | 10/2014 | Vittal et al. | |
| 8,914,513 B2 | 12/2014 | Dutta et al. | |
| 9,141,626 B2 * | 9/2015 | Rajpal | G06F 3/0605 |
| 9,207,961 B2 | 12/2015 | Conrad et al. | |
| 2012/0005435 A1 * | 1/2012 | Emaru | G06F 3/0608 |
| | | | 711/154 |
| 2012/0239899 A1 * | 9/2012 | Adderly | G06F 9/5016 |
| | | | 711/170 |
| 2013/0067187 A1 * | 3/2013 | Moss | G06F 3/0689 |
| | | | 711/170 |
| 2014/0279966 A1 * | 9/2014 | Rajpal | G06F 3/0605 |
| | | | 707/693 |
| 2014/0325620 A1 | 10/2014 | Samson et al. | |
| 2014/0365658 A1 | 12/2014 | Lang et al. | |
| 2015/0052354 A1 * | 2/2015 | Purohit | G06F 21/6218 |
| | | | 713/165 |

(Continued)

FOREIGN PATENT DOCUMENTS

CN          103327084          9/2013

OTHER PUBLICATIONS

"Structure Computer organization" by Tanenbaum, (Year: 1984).*

(Continued)

*Primary Examiner* — Tracy C. Chan
(74) *Attorney, Agent, or Firm* — Lowenstein Sandler LLP

(57) ABSTRACT

A request to provide storage resources for an application may be received and storage resource pools that are available to provide storage resources may be identified. A determination may be made as to whether any of the storage resource pools has an available amount of storage resources to provide the requested amount of storage resources for the application. If none have the available amount of storage resources, then two or more of the storage resources may be identified in view of an amount of available storage resources available at each of the storage resource pools. A logical address space may be created in view of the two or more storage resource pools.

12 Claims, 5 Drawing Sheets

(56) References Cited

U.S. PATENT DOCUMENTS

2017/0109080 A1* 4/2017 Liu .................... G06F 12/0842

OTHER PUBLICATIONS

Sridharan et al., Defragmentation of Resources in Virtual Desktop Clouds for Cost-Aware Utility-Optimal Allocation, https://www.google.com/url?sa=t&rct=j&q=&esrc=s&source=web&cd=1&cad=rja&uact=8&ved=0ahUKEwiqyc-XoZXLAhXKB44KHUy2DSMQFggcMAA&url=http%3A%2F%2Fgroups.geni.net%2Fgeni%2Fraw-attachment%2Fwiki%2FFirstGenCalyam%2Fvdc-defrag-ucc11pdf&usg=AFQjCNE67wMEY1wGHvD7_URPfsq1Tc9FBw&bvm=bv.115339255,d.c2E, published on Dec. 5, 2011.

Venkataraman, Defragmentation of Resources in Virtual Desktop Clouds for Cost-Aware Utility-Maximal Allocation, https://etd.ohiolink.edu/!etd.send_file?accession=osu1339747492, The Ohio State University, published on 2012, 79 pages.

Hou et al., A Provident Resource Defragmentation Framework for Mobile Cloud Computing, http://ieeexplore.ieee.org/xpl/login.jsp?tp=&arnumber=7265056&url=http%3A%2F%2Fieeexplore.ieee.org%2Fiel7%2F6245516%2F6558478%2F07265056.pdf%3Farnumber%3D7265056, Weigang Hou is with the School of Information Science and Engineering, Northeastern University, China, published on Sep. 14, 2015, 1 page.

* cited by examiner

LOGICAL ADDRESS SPACE FOR STORAGE RESOURCE POOLS

TECHNICAL FIELD

Aspects of the disclosure relate generally to storage resource pools and, more specifically, relate to a logical address space for storage resource pools.

BACKGROUND

A distributed file system may be a file system that stores data across multiple servers. For example, files may be stored in the distributed file system across multiple storage resources that are managed by multiple servers. Users may access the distributed file system by logging in to a client system and requesting access to read files that are stored in the distributed file system or to write files to be stored in the distributed file system.

The storage resources may use a type of file system that may be used to control the storing and retrieving of files stored at the storage resources. In general, the distributed file system may include storage resources of a single type of file system.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Figure 1:
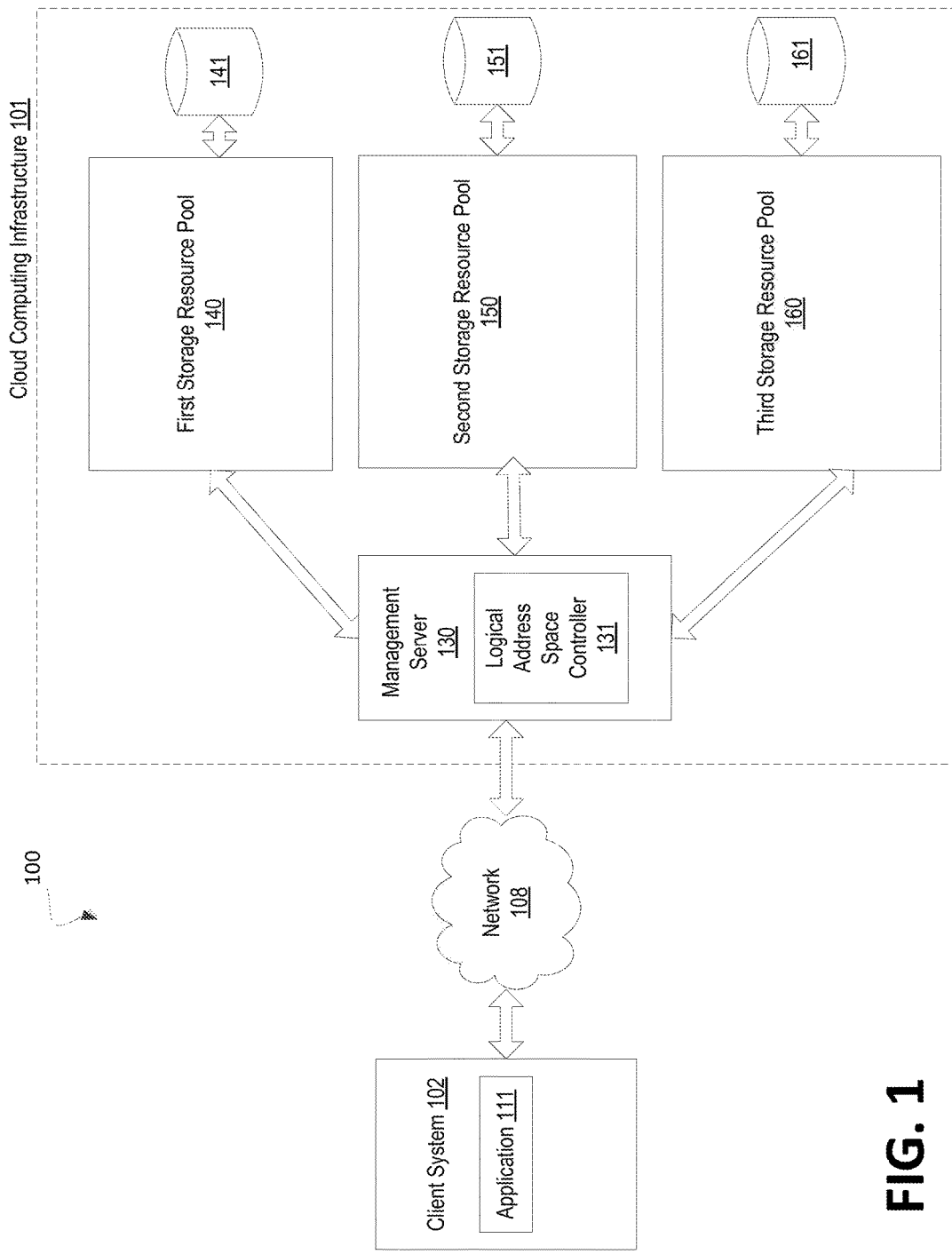
FIG. 1 illustrates an example system architecture in which embodiments of the disclosure may operate.

Embodiments of the disclosure relate to a logical address space for storage resource pools using different file systems. A cloud computing infrastructure or system may be a type of distributed computing system that is used to provide storage resources from multiple storage resource pools. In general, the cloud computing infrastructure may receive a request to provide storage resources to an application of a remote client system.

The storage resource pools may each be based on different types of file systems. For example, a first storage resource pool may provide a first amount of storage resources based on a first type of file system and a second storage resource pool may provide a second amount of storage resources based on a second type of file system. When a remote client system transmits a request for a particular amount of storage resources of the cloud computing infrastructure to be provided for an application, the cloud computing infrastructure may identify whether one of the storage resource pools has an amount of available storage resources to satisfy the requested amount of storage resources. If none of the storage resource pools individually has an amount of available storage resources that equals or exceeds the requested amount of storage resources, then the cloud computing infrastructure may not be able to provision the requested storage resources for the application. As an example, if the first storage resource pool and the second storage resource pool each has one terabyte of storage resources available and the requested amount of storage resources to be provided for the application is two terabytes, then the cloud computing infrastructure may not be able to provide the requested two terabytes for the application as neither storage resource pool has two terabytes of storage resources available. As the cloud computing infrastructure may provide storage resources for many applications over a period of time, the underlying storage resources provided by the different storage resource pools may be increasingly fragmented (e.g., different amounts of storage resources are used for different applications), thereby resulting in more difficulty to provide storage resources for an application that needs a larger amount of storage resources.

Aspects of the present disclosure may address the above and other deficiencies by creating a logical address space, or a storage overlay, when no storage resource pool of the cloud computing infrastructure has an available amount of storage resources to satisfy a requested amount of storage resources for an application. The logical address space may include logical addresses where each logical address includes a pointer to portions of storage resources of a storage resource pool. Furthermore, the logical address space may include pointers to multiple storage resource pools with different types of file systems so that the requested amount of storage resources may be satisfied. For example, a first portion of the logical address space may point to a first amount of storage resources of a first storage resource pool and a second portion of the logical address space may point to a second amount of storage resources of a second storage resource pool where a combination of the first amount of storage resources and the second amount of storage resources satisfies a requested amount of storage resources.

The selection of the storage resource pools that are to be used to provide the storage resources that are pointed to by the logical address space may be based on one or more factors. For example, storage resource pools may be selected or identified based on a type of file system, a level of performance for the application, and an amount of available storage resources that are available at a particular storage resource pool.

FIG. 1 is an example system architecture 100 for various implementations of the disclosure. The system architecture 100 may include a cloud computing infrastructure 101 coupled to one or more client machines 102 via a network 108. The network 108 may be a public network (e.g., the Internet), a private network (e.g., a local area network (LAN) or wide area network (WAN)), or a combination thereof. Network 108 may include a wireless infrastructure, which may be provided by one or multiple wireless communications systems, such as a wireless fidelity (WiFi) hotspot connected with the network 108 and/or a wireless carrier system that can be implemented using various data processing equipment, communication towers, etc.

The cloud computing infrastructure 101 may include multiple storage resource pools 140, 150, and 160 each of which may control and manage any number of storage resources 141, 151, or 161. The first storage resource pool 140, second storage resource pool 150, and third storage resource pool 160 may include a network-accessible server-based functionality (e.g., via a storage server) or other data processing equipment that may allow access to respective storage resources 141, 151, or 161. The storage server of a storage resource pool 140, 160, or 160 may include, but is not limited to, any data processing device, such as a desktop computer, a laptop computer, a mainframe computer, a personal digital assistant, a rack-mount server, a hand-held device or any other device configured to process data. The storage resources of the storage resource pools of the cloud computing infrastructure 101 may be grouped into one or more clusters. A cluster may be a group of linked storage resources of a particular storage resource pool.

The storage resources 141, 151, and 161 may be mass storage devices, such as magnetic or optical storage based disks, solid-state drives (SSDs) or hard drives, coupled to the storage servers of the storage resource pools (either directly or via the network 108). The storage resources 141, 151, and 161 may also include memory such as random access memory (RAM), Flash memory, and so forth. For convenience, some embodiments provided herein may be described with reference to disks or other mass storage devices. However, it should be understood that such embodiments may also apply to memory storage resources.

storage resource pools 140, 150, and 160 may include a storage server that hosts a local file system that manages the storage of data on the respective storage resources. Each of the storage resources may be formatted in accordance with a particular local file system. The local file system may create directories, partitions, logical volumes, and so forth on the storage resources as well as store data (e.g., files) thereon. Examples of local file systems that may be used on disk storage resources include, but are not limited to, a Network File System (NFS), Ceph Filesystem (Ceph FS), Gluster FS and a scale-out network-attached storage file system. Various flash file systems, tape file systems, optical disc file systems, memory files systems and so on may alternatively be used for other non-disk storage resources (e.g., for memory storage resources).

Storage servers of the storage resource pools 140, 150, and 160 may each additionally include an instance of a distributed file system service. The distributed file system service may interface with local file systems to store files on the storage resources, as well as allow retrieval of stored files to the client system 102. The distributed file system service instances additionally interface with one another.

The distributed file system services of the storage resource pools 140, 150, and 160, and thus the cloud computing infrastructure 101, may store data as files and may include directories, also referred to as folders, which are virtual containers within the cloud computing infrastructure 101, in which groups of computer files and possibly other directories may be kept and organized. The cloud computing infrastructure 101 may organize data (e.g., files) in the storage resources 141, 151, and 161 using volumes. A volume may be a single accessible storage area of the cloud computing infrastructure 101, which can be resident on a single partition or directory of a storage resource of one or more of the storage resource pools of the cloud computing infrastructure 101. A volume can be a representation of a logical location, rather than a physical location, of a storage area in the cloud computing infrastructure 101. For example, a physical hard disk-1 may have two partitions, partition-1 and partition-2. A volume label "C:" may be assigned to partition-1 and a volume label "D:" may be assigned to partition-2. Hard disk-1 is a physical disk and "C:" and "D:" are volumes representing logical locations on physical hard disk-1. Additionally, the volume may be a collection of multiple logical and/or physical locations.

Any number of client systems 102 may include an application 111 that is to use storage resources of a storage resource pool. The client system 102 may a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader and the like. The client machines 102 may host one or more applications 111. An application 111 may be any type of application including, but not limited to, a web application, a desktop application, a browser application, etc. An application 111 may request access (e.g., read, write, etc.) to the data in the cloud computing infrastructure 101. For example, the application 111 may request to read files from or write files to the storage resources of a storage resource pool.

The cloud computing infrastructure 101 may include a management server 130 that may include a logical address space controller 131. As described in further detail below, the logical address space controller 131 may create a logical address space, or a virtual address space, in response to a request from a client system 102 to provide an amount of storage resources for the application. For example, the logical address space may be created to map or point to storage resource 141 of the first storage resource pool 140 and the storage resource 151 of the second storage resource pool 150.

Figure 2:
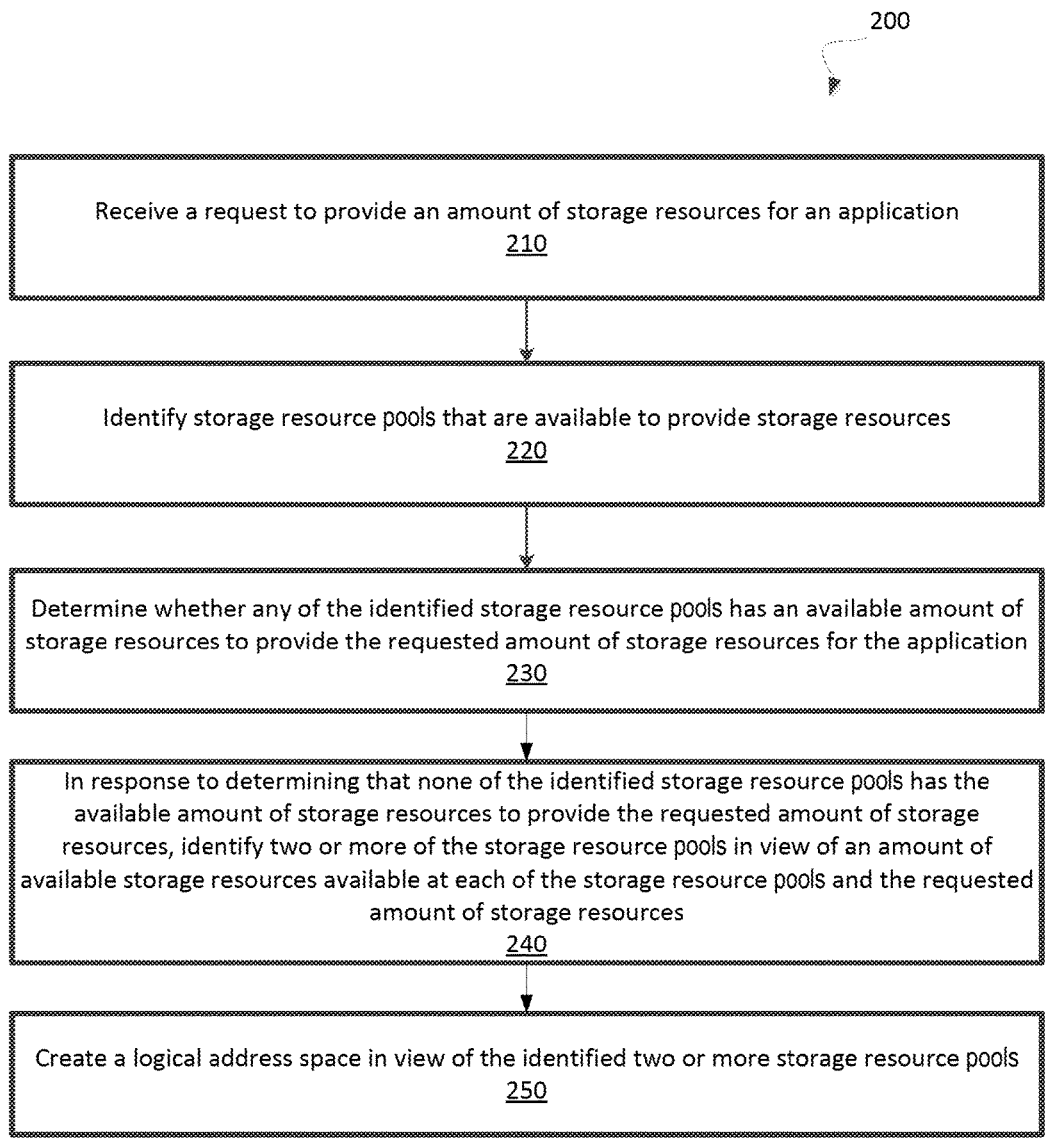
FIG. 2 is a flow diagram of an example method to create a logical address space corresponding to different storage resource pools using different file systems for storage resources in accordance with some embodiments of the disclosure.

FIG. 2 is a flow diagram of an example method 200 to create a logical address space corresponding to different storage resource pools using different file systems for storage resources. The method 200 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 200 may be performed by a logical address space controller 131 as described with regard to FIG. 1.

As shown in FIG. 2, the method 200 may begin with the processing logic receiving a request to provide an amount of storage resources for an application (block 210). For example, a remote client system may transmit a request for a persistent volume of a cloud computing infrastructure to be provided by one or more storage resource pools included in the cloud computing infrastructure. The processing logic may further identify storage resource pools that are available to provide storage resources (block 220). For example, the storage resource pools of the cloud computing infrastructure that have currently available storage resources (e.g., storage resources that are not used to provide a persistent volume for other applications) may be identified. Furthermore, the processing logic may determine whether any of the identified storage resource pools has an available amount of storage resources to provide the requested amount of storage resources for the application (block 230). For example, a determination may be made as to whether any one of the storage resource pools of the cloud computing infrastructure has enough available storage resources to provide the requested amount of storage resources. In response to the processing logic determining that none of the storage resource pools has the available amount of storage resources to provide the requested amount of storage resources, the processing logic may further identify two or more of the storage resource pools in view of an amount of available storage resources available at each of the storage resource pools and the requested amount of storage resources (block 240). For example, the storage resource pools with the least amount of available storage resources may be identified. The identifying of the storage resource pools with the least amount of available storage resources may allow for less fragmentation in other storage resource pools so that the less fragmented storage resource pools may be able to provide storage resources for other applications. The available storage resources at each of the two or more identified storage resource pools may satisfy the requested amount of storage resources. The processing logic may further create a logical address space in view of the identified two or more storage resource pools (block 250). The logical address space may include multiple logical address blocks where each logical address block includes a pointer to a physical address block of a storage resource at one of the storage resource pools. In some embodiments, the pointers of the logical address space may be weighted based on one or more requirements associated with the application requesting the amount of storage resources as described in further detail with regards to FIGS. 3 and 4.

Figure 3:
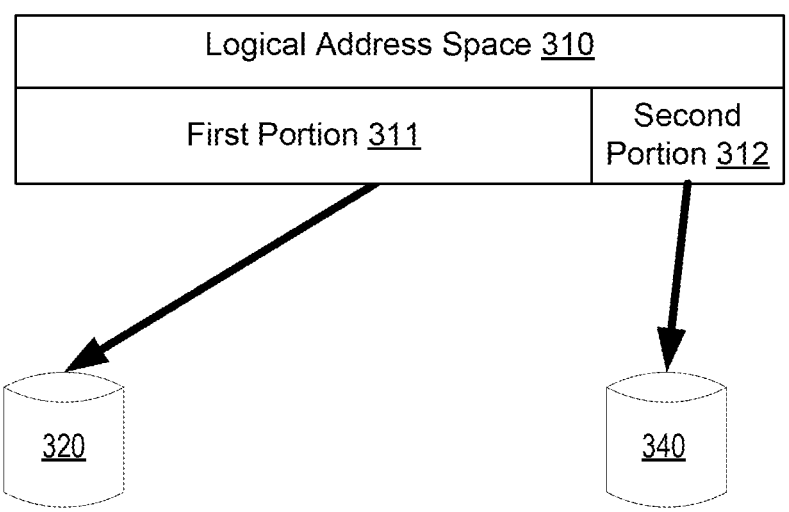
FIG. 3 illustrates pointers of a logical address space that has been created in accordance with some embodiments.

FIG. 3 illustrates pointers of a logical address space 310 that has been created. In general, the logical address space 310 may be created in response to a request for an amount of storage resources that are to be provided by a first storage resource pool and a second storage resource pool of a cloud computing infrastructure. The logical address space 310 may be created or generated by the logical address space controller 131 of FIG. 1.

As shown in FIG. 3, the logical address space 310 may include a first portion 311 of logical address blocks that point to storage resources of a storage resource pool 320 and a second portion 312 of other logical address blocks that point to other storage resources of another storage resource pool 340. The logical address space 310 may include a number of logical address blocks that correspond to a requested amount of storage resources for an application. The logical address blocks may point to the first storage resource pool providing the storage resource 320 and the second storage resource pool that is providing the storage resource 340.

In operation, the logical address space 310 may be used by an application to read data from and to write data to storage resources 320 and 340 from the first and second storage resource pools. For example, in response to a read request identifying a logical block address in the first portion 311, the data of the storage resource 320 that is pointed to by the logical block address may be retrieved. Similarly, in response to a read request identifying another logical block address in the second portion 312, the data of the storage resource 340 that is pointed to by the other logical block address may be retrieved. As such, the logical address space 310 may be used by an application to read and/or write data (e.g., files) at particular locations within the logical address space 310 that are separately mapped or pointing to different locations within the storage resource 320 at the first storage resource pool and the storage resource 340 at the second storage resource pool.

In general, the distribution of logical block addresses between the first portion 311 and the second portion 312 may be based on a requirement associated with the application requesting the storage resources. For example, a number of pointers to the storage resource 320 of the first storage resource pool and a number of pointers to the storage resource 340 of the second storage resource pool may be based on the requirement of the application. The requirement may be, but is not limited to, a performance requirement of the application or a cost or pricing associated with the application. For example, a performance requirement of the application may be used to determine the number of pointers to the storage resource 320 and the number of pointers to the storage resource 340 so that the overall performance of the application when reading or writing data or files to the storage resources 320 and 340 satisfy the performance requirement of the application. As an example, the application may specify a performance requirement of an average latency for read requests and write requests for the application. The storage resources for the application may be provided by a first storage resource pool that may provide storage resources at a first latency and a second storage resource pool that may provide storage resources at a second latency. The distribution between logical address blocks that point to the storage resources of the first storage resource pool and the storage resources of the second storage resource pool may be based on an average latency of the logical block addresses so that the average latency based on the latency of each logical block address satisfies the performance requirement of the application. For example, the logical address space for the application may be 100 logical block addresses with a performance requirement at a minimum latency value of 10 milliseconds (ms) and the logical address space may be based on a first storage resource of a first storage provider that is associated with a performance for read and write requests at 5 milliseconds and a second storage resource of a second storage resource pool that is associated with a performance of 15 milliseconds, then 50 logical block addresses may point to the first storage resource and 50 logical block addresses may point to the second storage resource as the average performance associated with each of the logical block addresses may be 10 milliseconds. As such, the pointers of the logical address space may be distributed between storage resources of different storage resource pools so that the performance requirement associated with the application is satisfied (e.g., the average performance associated with the logical block addresses satisfies the performance requirement).

Similarly, the distribution of the pointers of the logical address space may be based on a cost requirement associated with the application. For example, a request to provide an amount of storage resources for the application may identify an average cost for the requested storage resources. The distribution of the logical address blocks that point to the first storage resource and the logical address blocks that point to the second storage resource may be provided so that the average cost for the logical address space satisfies the cost requirement. For example, the average cost associated with all of the logical block addresses of the logical address space may be equal to or less than the cost requirement associated with the application.

In some examples, the distribution of the pointers of the logical address space may be based on the types of file systems of the storage resource pools. For example, storage resource pools that provide storage resources of the same type of file system may be preferred over storage resource pools with different types of file systems. Furthermore, the distribution of the pointers of the logical address space may be based on the capability of different storage resources provided by different storage resource pools. For example, the pointers of the logical address space may be distributed between two storage resource pools associated with different types of file systems that are selected from multiple storage resource pools. The two storage resource pools may be selected based on a number of capabilities of the different types of file systems that are in common or shared. For example, two storage resource pools out of an available three storage resource pools may be needed to provide storage resources for an application. The first storage resource pool may provide storage resources of a first type of file system, the second storage resource pool may provide storage resources of a second type of file system, and the third storage resource pool may provide storage resources of a third type of file system. Two out of the first, second, and third storage resource pools may be selected to provide the storage resources for the application based on the capabilities of the first, second, and third types of file systems. For example, if the first and second types of file systems share a first number of capabilities (e.g., caching capability, optimization, capability, etc.) and the first and third types of file systems share a second number of capabilities that is lower than the first number, then the first and second storage resource pools may be selected to provide the storage resources for the pointers of the logical address space that is to be created for the application.

Figure 4:
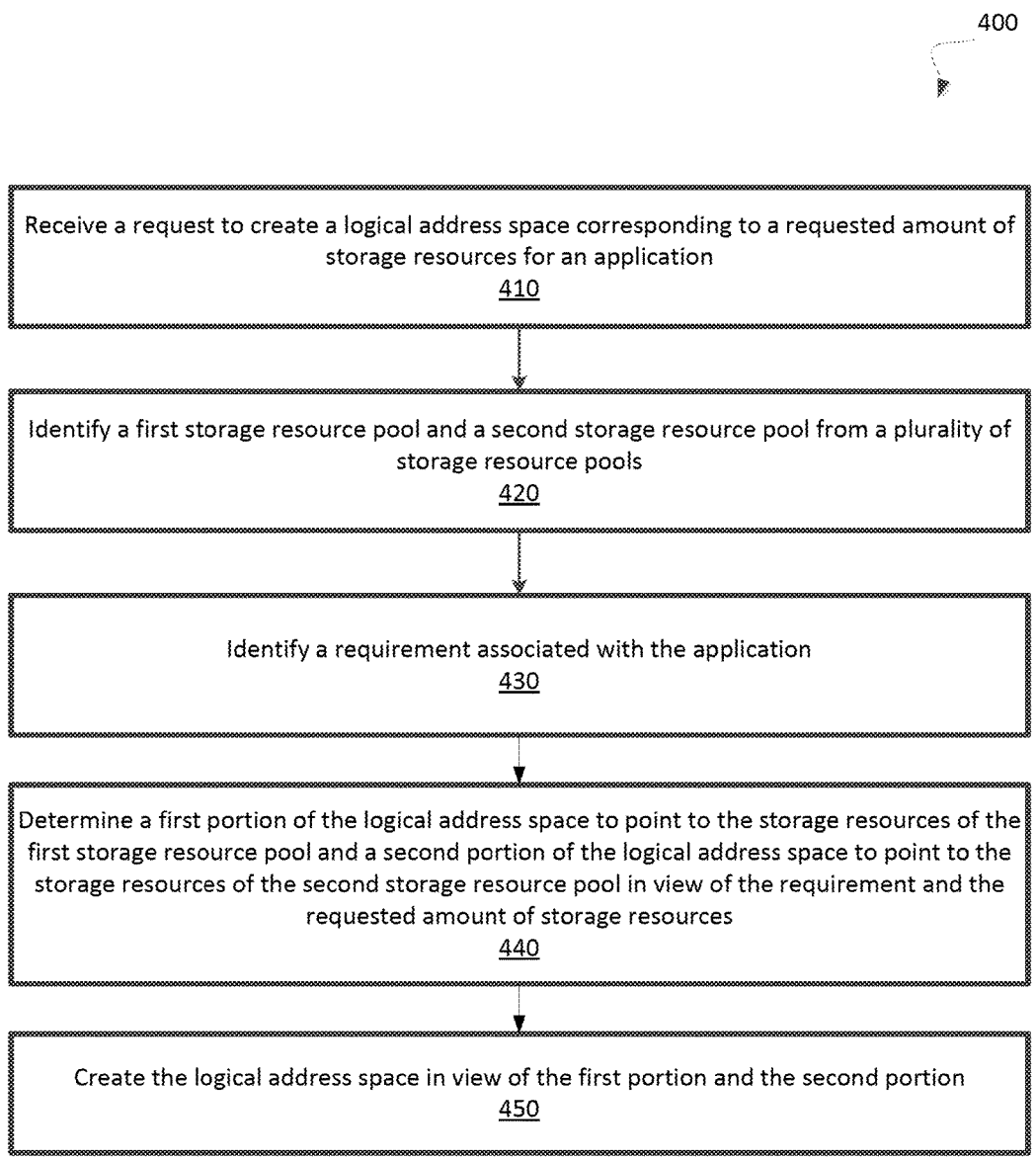
FIG. 4 is a flow diagram of an example method to generate portions of a logical address space in accordance with some embodiments of the disclosure.

FIG. 4 is a flow diagram of an example method 400 to generate portions of a logical address space. The method 400 may be performed by processing logic that may comprise hardware (e.g., processing device, circuitry, dedicated logic, programmable logic, microcode, etc.), software (e.g., instructions run or executed on a processing device), or a combination thereof. In some embodiments, the method 400 may be performed by a logical address space controller 131 as described with regard to FIG. 1.

As shown in FIG. 4, the method 400 may begin with the processing logic receiving a request to create a logical address space corresponding to a requested amount of storage resources for an application (block 410). The processing logic may further identify a first storage resource pool and a second storage resource pool from multiple storage resource pools (block 420). For example, two storage resource pools that in combination have an available amount of storage resources that is equal to or greater than the requested amount of storage resources may be identified. In some embodiments, the two storage resource pools may be the storage resource pools from among the multiple storage resource pools with the least amount of available storage resources while being able to provide the requested amount of storage resources. The processing logic may further identify a requirement associated with the application (block 430). For example, the requirement may correspond to a performance requirement or a cost requirement. Subsequently, the processing logic may determine a first portion of the logical address space to point to the storage resources of the first storage resource pool and a second portion of the logical address space to point to the storage resources of the second storage resource pool in view of the requirement and the requested amount of storage resources (block 440). For example, the distribution of pointers to the first storage resource pool and pointers to the second storage resource pool may be based on the pointers satisfying the requirement associated with the application. The processing logic may further create the logical address space in view of the first portion and the second portion (block 450).

Figure 5:
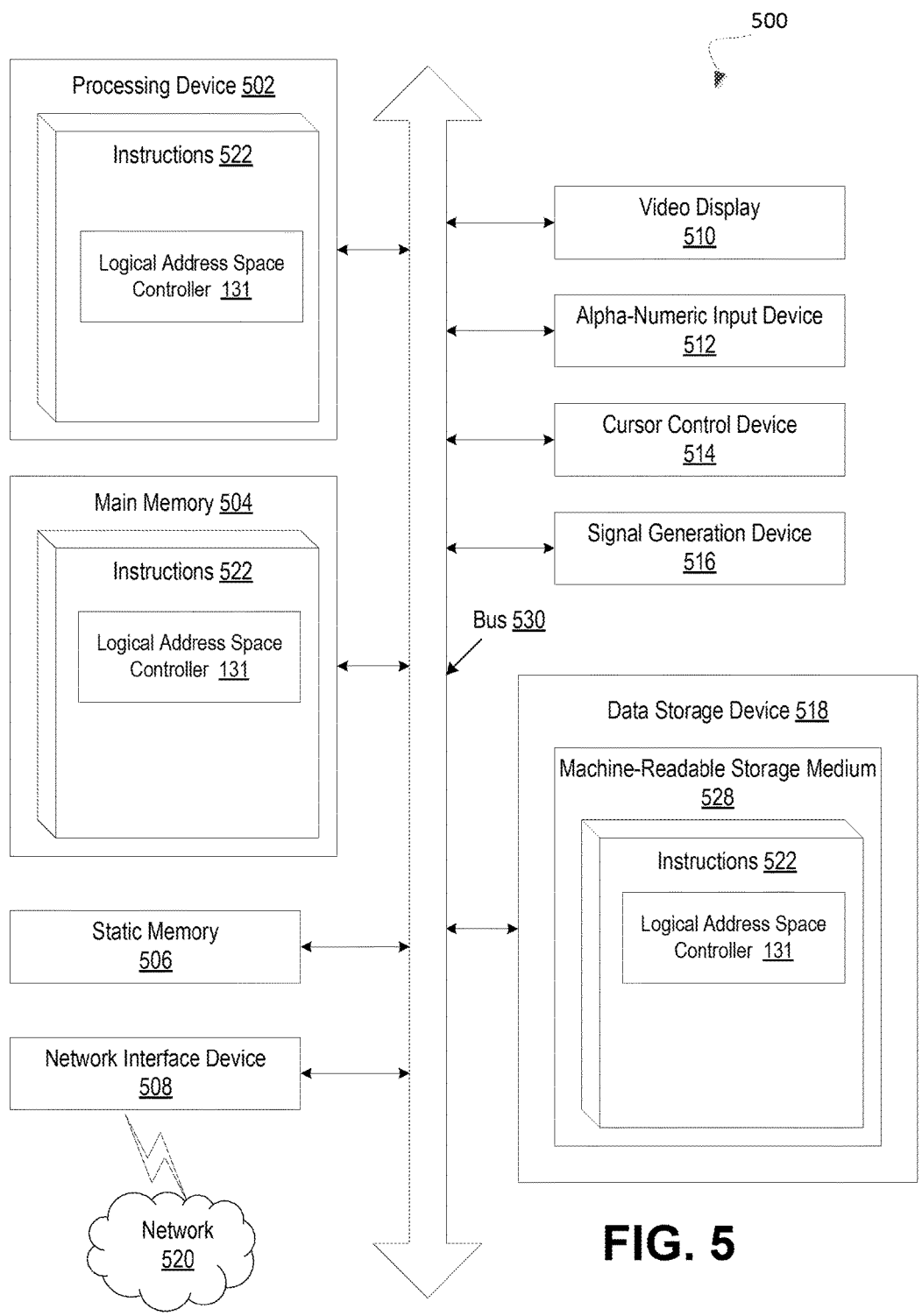
FIG. 5 illustrates a block diagram of an embodiment of a computer system in which some embodiments of the disclosure may operate.

FIG. 5 illustrates an example machine of a computer system 500 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or DRAM (RDRAM), etc.), a static memory 506 (e.g., flash memory, static random access memory (SRAM), etc.), and a data storage device 518, which communicate with each other via a bus 530.

Processing device 502 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-readable storage medium 528 (also known as a computer-readable medium) on which is stored one or more sets of instructions or software 522 embodying any one or more of the methodologies or functions described herein. The instructions 522 may also reside, completely or at least partially, within the main memory 504 and/or within the processing device 502 during execution thereof by the computer system 500, the main memory 504 and the processing device 502 also constituting machine-readable storage media.

In one implementation, the instructions 522 include instructions for a logical address space controller (e.g., logical address space controller 131 of FIG. 1) and/or a software library containing methods that call operations of a logical address space controller. While the machine-readable storage medium 528 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
   receiving a request to provide an amount of storage resources for an application;
   identifying storage resource pools that are available to provide storage resources;
   determining whether any of the identified storage resource pools has an available amount of storage resources to provide the requested amount of storage resources for the application;
   in response to determining that none of the identified storage resource pools has the available amount of storage resources to provide the requested amount of storage resources, identifying, by a processing device, two or more of the storage resource pools in view of an amount of available storage resources available at each of the storage resource pools, wherein the two or more storage resource pools have fewer available storage resources than at least one other storage resource pool of the identified storage resource pools, and wherein each of the two or more of the storage resource pools is associated with different types of file systems;
   identifying a performance requirement associated with the application; and
   creating a logical address space for the application in view of the identified two or more of the storage resource pools, wherein a distribution of pointers to the two or more storage resource pools associated with the logical address space is in view of the performance requirement associated with the application, and wherein the distribution corresponds to a first number of pointers to a first storage resource pool of the two or more storage resource pools and a second number of pointers to a second storage resource pool of the two or more storage resource pools to satisfy the performance requirement associated with the application.

2. The method of claim 1, further comprising:
   in response to determining that one of the identified storage resource pools has the available amount of storage resources to provide the requested amount of storage resources for the application, creating another logical address space for the application in view of the one of the identified storage resource pools.

3. The method of claim 1, wherein creating the logical address space for the application in view of the identified two or more of the storage resource pools comprises:
   creating a first portion of the pointers of the logical address space to point to the first storage resource pool of the two or more storage resource pools; and creating a second portion of the pointers of the logical address space to point to the second storage resource pool of the two or more storage resource pools.

4. The method of claim 3, wherein the creating of the first portion of the pointers and the second portion of the pointers are in view of a performance of the two or more storage resource pools.

5. The method of claim 1, further comprising: identifying a type of file system associated with each of the identified storage resource pools.

6. The method of claim 5, wherein creating the logical address space for the application is further in view of the type of file system associated with each of the identified storage resource pools.

7. A system, comprising:
a memory; and
a processing device, operatively coupled with the memory, to:
receive a request to provide an amount of storage resources for an application;
identify storage resource pools that are available to provide storage resources;
determine whether one of the identified storage resource pools has an available amount of storage resources to provide the requested amount of storage resources for the application;
in response to determining that one of the identified storage resource pools does not have the available amount of storage resources to provide the requested amount of storage resources, identify two or more of the storage resource pools in view of an amount of available storage resources available at each of the storage resource pools, wherein the two or more storage resource pools have fewer available storage resources than at least one other storage resource pool of the identified storage resource pools, and wherein each of the two or more of the storage resource pools is associated with different types of file systems;
identify a performance requirement associated with the application; and
create a logical address space for the application in view of the identified two or more of the storage resource pools, wherein a distribution of pointers to the two or more storage resource pools associated with the logical address space is in view of the performance requirement associated with the application, and wherein the distribution corresponds to a first number of pointers to a first storage resource pool of the two or more storage resource pools and a second number of pointers to a second storage resource pool of the two or more storage resource pools to satisfy the performance requirement associated with the application.

8. The system of claim 7, wherein the processing device is further to:
in response to determining that one of the identified storage resource pools has the available amount of storage resources to provide the requested amount of storage resources for the application, create another logical address space for the application in view of the one of the identified storage resource pools.

9. The system of claim 7, wherein to create the logical address space for the application in view of the identified two or more of the storage resource pools, the processing device is further to:
create a first portion of the pointers of the logical address space to point to the first storage resource pool of the two or more storage resource pools; and
create a second portion of the pointers of the logical address space to point to the second storage resource pool of the two or more storage resource pools.

10. The system of claim 9, wherein the creating of the first portion of the pointers and the second portion of the pointers are in view of a performance of the two or more storage resource pools.

11. The system of claim 7, wherein the processing device is further to identify a type of file system associated with each of the identified storage resource pools.

12. The system of claim 11, wherein the creating of the logical address space for the application is further in view of the type of file system associated with each of the identified storage resource pools.

* * * * *